United States Patent [19]

Kono

[11] Patent Number: 5,430,070

[45] Date of Patent: Jul. 4, 1995

[54] FUNCTIONAL INSULATION RESIN COMPOSITION

[75] Inventor: Ryusuke Kono, 6-4 chome, Maboricho, Yokosuka, Kanagawa, Japan

[73] Assignee: Ryusuke Kono, Kanagawa, Japan

[21] Appl. No.: 357,119

[22] Filed: Dec. 16, 1994

[51] Int. Cl.⁶ .............................. C08J 9/28; C08J 9/30
[52] U.S. Cl. ........................................ 521/69; 521/65; 521/70; 521/71; 106/122
[58] Field of Search ...................... 521/65, 69, 70, 71; 106/122

[56] References Cited

U.S. PATENT DOCUMENTS 4,870,112  9/1989  Knipp et al. ........................... 521/70
4,990,541  2/1991  Nielsen et al. ........................ 521/70

*Primary Examiner*—Morton Foelak
*Attorney, Agent, or Firm*—Beveridge, DeGrandi, Weilacher & Young

[57] ABSTRACT

Newly developed polymeric materials are presented in a form of pellet, thread, sponge, rubber, or plate acting as a damper for shear mode and an absorber against outside noise. These materials provide multiple functions of damping, sound absorbency and insulation performance at audio frequency.

7 Claims, No Drawings

FUNCTIONAL INSULATION RESIN COMPOSITION

BACKGROUND OF THE INVENTION

This invention relates to a functional sound insulation resin composition useful against airborne-sound and structure-born sound, or more particularly to a sound insulator with absorbent and damping performance, composed of a polymeric material which comprises a polymer colloid, hardener, and an acoustic activity agent. The resin composition can be shaped into any desired form such as pellet, thread, sponge, rubbery sheet or hardened plate, and, like usual polymeric substances, it can be freely cut and bonded by an appropriate cement.

Conventional sound adsorbents for air-born sound make use of the frictional resistance of bubbles contained in porous materials. The disadvantages of those adsorbents are bulky volume, low absorbency and very poor efficiency for insulation agaist sound traveling from one room to another. While prior known sound insulators have been developed which place an emphasis on enhancing their density characteristics, such insulators are usually of heavy construction and poorly dissipate the sound energy. A compact and less heavy insulator with sufficient absorption has not yet been provided because of a tremendous difficulty to achieve a high loss material at an audio frequency especially below 1 KHz.

The dissipation process in an amorphous phase consists of two factors of shear and compressional losses in a homogenous body; the high shear absorbency is easily attainable while the large bulk absorbency is difficult to achieve.

With incident intensity $I_i$ and transmitted intensity $I_t$ of a sound wave impinging normally on a single viscoelastic plate of thickness d, mass m per unit area, and attenuation constant $\alpha$, the transmission loss TL is given by $TL=(I_i/I_t)10\alpha d/10$. When $\alpha \approx 0$ as in the conventional case, $TL_O=I_i/I_t$ is roughly given by the mass law. On the other hand, if $\alpha$ is large enough and comparable to the mass law loss, TL at the normal incidence is given by the equation $$TL = TL_O + \alpha d,$$

where $TL_O = 20\cdot\log_{10}(fm) - 42.5$ db and f is sound frequency. Differentiating the equation for the given transmission loss, one obtains $(\alpha/8.7)\Delta d = -\Delta m/m$ which indicates that an increase of $\alpha \geq d$ causes a decrease of the mass given by the expression–0 $\Delta \ln m$; the larger the absorption, the less the mass. The equation, therefore, is a guide to a quite unique approach for the insulation problem by enhancing the absorption itself, contrary to the usual techniques such as mixing heavy metallic powders to increase the loss. Assuming an upper limit $d \approx 3$ cm, for instance, in an insulation door, a desirable attenuation would be on the order of 5 db/cm or more around 0.5 KHz.

SUMMARY OF THE INVENTION

It is a primary object of the present invention to overcome the disadvantages of the conventional insulators by providing a functional insulation resin composition with two functions of absorption and damping performance for outside noise attributed to air-born sound and structure-born sound. The composition comprises a polymeric resin colloid, a hardener for the resin, and an acoustic activity agent.

A feature of the present invention resides in using a hardener such as tannin, lignin, or urea oligomer as an ingredient of its composition.

In carrying out the present invention, the composition has mixed therein an acoustic activity agent which is hydrazine or diethylamine to impart structural strength to the insulator in a dehydrated state.

A further object of the present invention is to provide a functional resin composition with sufficient damping performance by an appropriate addition of a plasticizer or hardener to modify its flexural mode behavior in a critical frequency region.

The present invention has a further object in the use of the functional sound insulation resin molding by employing a compatible polymer to improve its dimensional stability.

Recently applicant found sound absorptions between 10 HKz and 4 KHz using hydrated compounds of melanins, polyvinyl alcohol, and/or urea oligomer which were oxidized with ferric chloride and disclosed in Japanese Laid-open Patent Nos. 64-38795/1989, 1-284558/1989 and 1-312599/1989. Unfortunately the attenuation (found on the highest magnitude 2.5 db/em at 0.5 KHz) and the mechanical strength were not large enough for the sound insulation purpose. Furthermore the melanin compound may be expensive and the ferric complex may vigorously cause rusting of iron. The small moduli might have occured because of the required hydration for those polymers, otherwise the acoustic activity might be lost by dehydration to less than 30 wt % water content.

DESCRIPTION OF THE PREFERRED EMBODIMENTS

To overcome those faults a few of the acoustically active agents were successfully surveyed as described in the following Examples.

The present invention was also based on the discovery by applicant that a wide variety of synthetic resin emulsions such as polyvinyl acetate emulsion, polyacrylic emulsion, and rubber latex can absorb sound energy at audio frequency. These emulsions similarly lost the activity with a dehydration less than 30 wt % water content.

The far less expensive invention is illustrated by the following Examples showing the preparation of chemically inactive compositions comprising essentially dehydrated acoustic activity agents, hardeners, and synthetic resin polymer colloids for use as a sound insulation having a large absorbency with a high transmission loss wherein all parts and percentages are by weight unless otherwise designated.

EXAMPLES

Commercially available polymer colloids and thermosetting resins were used in an aqueous state. Useful polymer colloids include synthetic resin aqueous emulsions such as ethylene vinylacetate emulsion, vinylchloride emulsion, vinylidene chloride emulsion, acrylate emulsion, urethane emulsion, phenol emulsion, epoxy resin emulsion, polypyrol emulsion, polyaniline emulsion, asphalt emulsion, as well as natural rubber latex, acrylonitrile-butadiene rubber latex (NBR), styrene-butadiene rubber latex or mixtures of these copolymers.

Useful thermosetting resins comprise oligomers of urea, melamine, phenol, resorcinol, and those copolymers in an early polymerzation state. Commercially available powdered tannins and lignins were hydrated as a hardener. Tannin, widely distributed in the plant kingdom, is hydrolyzed to phenolic acid and glucose, acting as a hardener for gelatin, protein etc, through hydrogen bonding between two groups -OH and $NH_2$-, -NH-, or -CONH. Tannic acid which is tannin in a narrow sense and pyrogallol which is a component of tannin are typically used as dilute aqueous solution; both of them give almost the same absorption. As used herein the term "hydrated" means in the form of an aqueous composition; i.e., solution, emulsion, dispersion, etc. Phyrogallol tannin, catechol tannin, tannin extract, catechu, and catechin are also appropriate because of having a phenolic group. The term "tannin" is intended to include all of its variations as noted above.

Hydrazine and diethylamine were found to act as an acoustic activity agent because the high absorption property was maintained. Either one or both together can be used for purposes of the invention.

Vinylacetate polymer emulsion was carefully mixed with 26–34% hydrated urea oligomer containing 1 to 3% formaldehyde and hydrazine monohydrate or diethylamine in predetermined compositions of the recipe listed in table 1. Adding a dilute aqueous tannin as a hardener the mixture was gently stirred to avoid bubble inclusion and molded into a solid plate at room temperature. If necessary the mixture can be molded at temperatures up to 100° C. or more. The plate was dried to nearly 0% water content in a desiccator for 20 days. The values of TL and $TL_O$ were measured by an insulation box and $\alpha$ resulted using the equation above. All examples had high attenuations over 5 db/cm in a frequency range from 27 Hz to 8 KHz. Experimental error of attenuation $\alpha$ was ±30%. They may serve for the functional sound insulator in the sense predicted by the equation above. As used herein, the term "dehydrated" means essentialy dry.

Acidic, neutral, and basic lignins can be used; actually measured with a pH=3.5 to 9, giving almost the same absorption within the error of measurement equipment.

Components of recipes in making the products of the invention contained from 40 to 91% of dehydrated polymer colloid, from 0 to 47% of dehydrated thermosetting resin, from 1 to 11% of pure hardener on a dry basis, and from 1 to 14% acoustic activity agent on a dry basis.

The present data proved that a destruction of absorbency of polymer colloid in a drying process is effectively quenched to an active state in which physical-chemical structure keeps sound absorption high enough by an addition of hydrazine or diethylamine, otherwise a gradual decrease of absorption occurs.

Using the species in Table 1 in the same procedure, various Examples are listed in Tables 2 to 4.

TABLE 1

| Composition (Weight %) | Example | | | | Comparison Example | |
|---|---|---|---|---|---|---|
| | 1 | 2 | 3 | 4 | 1 | 2 |
| Styrene-butadien rubber latex (SBR)[a] (dry part %) | | | 52 (58.1)* | | | |
| Vinylacetate emulsion[b] (dry part %) | 51 (56.0) | | | | | |
| Vinylchloride emulsion[c] (dry part %) | | 52 (60.4) | | | | |
| Urethan emulsion[d] (dry part %) | | | | 52 (60.0) | 50 (59.3) | 66 (59.6) |
| Alkaline Urea Oligomer[e] (dry part %) | 23 (35.4) | 24 (35.5) | 24 (37.6) | 24 (35.9) | 25 (38.5) | 33 (38.7) |
| Hardener: 96% hydrated Tannic Acid (dry part %) | 23 (2.0) | 24 (2.0) | 24 (2.1) | 24 (2.0) | 25 (2.2) | 0 (0.0) |
| Acoustic activity agent: Hydrazine monohydrate (dry part %) | 3 (6.6) | 1 (2.1) | 1 (2.2) | 1 (2.2) | 0 (0.0) | 1 (1.7) |
| Attenuation Constant db/cm | | | | | | |
| 125 Hz | 22 | 10 | 15 | | | |
| 500 Hz | 9 | 10 | 10 | 11 | 0 | 0 |
| 1 KHz | 9 | 10 | 5 | | | |

[a]NIPPON ZEON CO., LTD., Nipol LX 119, dry part 50%
[b]SHOUEI CHEMICAL PRODUCTS CO., LTD., KV-715NN, dry part 50%
[c]NIPPON ZEON CO., LTD., Nipol G 576, dry part 55%
[d]DAINIPPON INK CHEMICAL PRODUCTS CO., LTD., Hydran HW-311, dry part 54%
[e]SHOUEI CHEMICAL PRODUCTS CO., LTD., SC-I, dry part 70%
*The value in parentheses on Tables 1–5 shows weight % of recipes after mixture dried to dehydrated state.

TABLE 2

| Composition (Weight %) | Example | | | | | |
|---|---|---|---|---|---|---|
| | 5 | 6 | 7 | 8 | 9 | 10 |
| Vinylacetate emulsion (dry part %) | 62 (52.4) | | 8 (6.3) | | | |
| Urethane emulsion (dry part %) | | 64 (55.9) | | | | |
| Acryronitril-butadien rubber latex (NBR)[f] | | | 50 (40.4) | | | |
| SBR (dry part %) | | | | | 50 (42.4) | |
| Ethylene-vinylacetate emulsion[g] | | | | | | 64 |

TABLE 2-continued

| Composition (Weight %) | Example 5 | 6 | 7 | 8 | 9 | 10 |
|---|---|---|---|---|---|---|
| (dry part %) | | | | | (55.9) | |
| Vinylchloride emulsion | | | | | | 64 |
| (dry part %) | | | | | | (57.2) |
| Alkaline urea oligomer | 33 | 29 | 28 | 28 | 29 | 29 |
| (dry part %) | (39.1) | (32.8) | (31.1) | (33.2) | (32.8) | (33.0) |
| Hardener: Lignin[h] | 2 | 3 | 6 | 6 | 3 | 3 |
| (dry part %) | (3.4) | (4.8) | (9.5) | (10.2) | (4.8) | (4.9) |
| Acoustic activity agent: | 3 | 4 | 8 | 8 | 4 | 4 |
| Hydrazine monohydrate | (5.1) | (6.5) | (12.7) | (13.6) | (6.5) | (4.9) |
| (dry part %) | | | | | | |
| 95.5% hydrated acetic acid (dry part %) | | | | 8 (0.6) | | |
| Attenuation Constant db/cm | | | | | | |
| 125 Hz | 11 | | | 7 | | |
| 500 Hz | 11 | 8 | 19 | 7 | 8 | 9 |
| 1 KHz | | | 12 | 7 | 5 | |

[f]NIPPON ZEON CO., LTD., Nipol 1551, dry part 51%
[g]SHOUEI CHEMICAL PRODUCTS CO., LTD., INSTER BOND KC-905, dry part 45%
[h]SANYO KOKUSAKU PULP CO., LTD., Vanilex HW and Baniol NDP., dry part 85%

TABLE 3

| Composition (Weight %) | Example 11 | 12 | 13 | 14 | Application Example 1 | 2 |
|---|---|---|---|---|---|---|
| Ethylene-vinylacetate emulsion | | | | | 30 | 62 |
| (dry part %) | | | | | (50.5) | (52.4) |
| Vinylidene chloride emulsion[i] | 64 | | | | | |
| (dry part %) | (54.0) | | | | | |
| Natural rubber latex[j] | | 93 | 64 | | | |
| (dry part %) | | (90.3) | (62.1) | | | |
| Acrylate emulsion[k] | | | | 91 | | |
| (dry part %) | | | | (86.2) | | |
| Alkaline urea oligomer | 29 | 0 | 29 | 0 | 16 | 33 |
| (dry part %) | (34.2) | | (28.2) | | (37.7) | (39.1) |
| Hardener: lignin | 3 | 3 | 3 | 4 | 3 | 2 |
| (dry part %) | (5.1) | (4.2) | (4.2) | (6.9) | (10.1) | (3.4) |
| Acoustic activity agent: | 4 | | | 4 | 0.5 | 3 |
| Hydrazine monohydrate | (6.7) | | | (6.9) | (1.7) | (5.1) |
| (dry part %) | | | | | | |
| Diethylamine | | 4 | 4 | | | |
| (dry part %) | | (5.5) | (5.5) | | | |
| 50% Polyvinyl acetate solution[l] | | | | | 50 | |
| (dry part %) | | | | | (84.2) | |
| Epoxy resin[m] | | | | | | 50 |
| (dry part %) | | | | | | (84.6) |
| Attenuation Constant db/cm | | | | | | |
| 125 Hz | | 6 | 10 | 7 | 5 | |
| 500 Hz | 8 | | 6 | 7 | 3 | 5 |
| 1 KHz | | | | | | |

[i]KUREHACHEMICAL PRODUCTS CO., LTD., Krehalon LA-RA., dry part 50%
[j]I.S.L.E. LABORATORIES, dry part 70%
[k]NIPPON CARBIDE PRODUCTS CO., LTD., Nikasol, dry part 55%
[l]CEMEDINE CO. LTD., 198L, dry part 50%
[m]KONISHI CO. LTD., Konishi Bond, dry part 100%

TABLE 4

| Composition (Weight %) | Example 15 | 16 | 17 | 18 | 19 |
|---|---|---|---|---|---|
| Vinylacetate emulsion | | 8 | 62 | 25 | 61 |
| (dry part %) | | (7.9) | (57) | (24) | (59) |
| NBR | | 49 | | 48 | |
| (dry part %) | | (49.0) | | (46) | |
| Asphalt emulsion[n] | 40 | | | | |
| (dry part %) | (44.7) | | | | |
| Alkaline melamin-urea oligomer[o] | | 33 (33.2) | | | |
| (dry part %) | | | | | |
| Alkaline urea oligomer | 31 | | | | |
| (dry part %) | (46.7) | | | | |
| Alkaline melamin oligomer[p] | | | | | 28 (32) |
| (dry part %) | | | | | |
| Alkaline phenol oligomer[q] | | | 28 (35) | | |
| (dry part %) | | | | | |
| Alkaline resorcinol oligomer[r] | | | | 24 (24) | |
| (dry part %) | | | | | |
| Hardener: lignin | 3 | 4 | 6 | 4 | 6 |
| (dry part %) | (6.4) | (7.9) | (6.5) | (5) | (7) |
| Acoustic activity agent: | 1 | 1 | 1 | 0.7 | 0.8 |
| Hydrazine monohydrate | (2.2) | (2.0) | (1.5) | (1) | (1.6) |
| (dry part %) | | | | | |
| Attenuation Constant db/cm | | | | | |
| 125 Hz | | | | | |
| 500 Hz | 7 | 10 | 5 | 6 | 8 |

TABLE 4-continued

| Composition (Weight %) | Example | | | | |
|---|---|---|---|---|---|
| | 15 | 16 | 17 | 18 | 19 |
| 1 KHz | | 6 | | | |

*NICHIREKI CHEMICAL PRODUCTS CO. LTD., CPE-3, dry part 52%
*SHOUEI CHEMICAL PRODUCTS CO., LTD., SA-30, dry part 51%
*SUMITOMO BAKELITE CO., LTD., UA-154, dry part 60%
*GUNEI CHEMICAL PRODUCTS CO. LTD., PL-2253, dry part 68%
*SUMITOMO BAKELITE CO., LTD., PR-500, dry part 60%

TABLE 5

| | Comparison Example | |
|---|---|---|
| Composition (Weight %) | 3 | 4 |
| Vinylacetate emulsion | 62 | 62 |
| (dry part %) | (54.3) | (55.2) |
| Alkaline urea oligomer | 33 | 33 |
| (dry part %) | (40.4) | (41.2) |
| Hardener: lignin | 0 | 2 |
| (dry part %) | (0) | (3.6) |
| Acoustic activity agent: diethylamine (dry part %) | 0 (0) | 0 (0) |
| Attenuation Constant db/cm | | |
| 125 Hz | 0 | 0 |
| 500 Hz | 0 | 0 |
| 1 KHz | 0 | 0 |

These Examples show also good absorber properties above 5 db/cm at 125Hz, 500Hz, and 1 KHz. An addition of acetic acid at 95.5% water content in Example 8 was to promote an aggregation of the mixture to form the product of the invention. Examples 12 and 14 show a case without urea oligmer still having good absorption.

Example 15 in Table 4 is a case of using an asphalt emulsion, and Example 16 is a case of using a copolymer of melamine and urea; either showing high absorbency above 5 db/cm at 500 Hz.

Since those compounds presented in Examples 5 and 9 to 11 showed nearly a unit density with a moderate stiffness on the order of $10^{10}$ dyne/cm$^2$ comparable to usual polymeric substances, they can be used for a damping device of structure-borne sound as well as transmission loss barriers of air-born sound if their moduli and loss coefficients are properly designated by taking account their viscoelastic properties in a transition region. Mechanical stability of the complex compositions of the invention is defined by the transition temperature widely changed by the basic components of plasticizer, hardener, and filler. As to the filler, mica, carbon black or alminum powder may be used. A proper blend of the basic components can be determined by trial and error techniques for those multi-purpose insulators; they are appropriate to the noise reduction device as a light weight insulation partition structure or panel. They are also useful for use as a caulking material; particularly for a sealing sound through a joint between barriers which are made by porous concretes. Typical cases are disclosed in Table 2 as a guide in selecting proper compounds.

Example 12, a rubber-like material, is changeable to a stiff plastic by applying appropriate vulcanization processes or an increase of urea oligomer. Conversely, hard plastic Examples 5 and 9 may be modified to soft plastics by an addition of a plasticizer such as di-n-butyl phthalate (DBP). A simple formulation for this is described; using DBP, in Example 5 where the polymer is plastized to a moderate damping effect with a Young's modules of $E' = 6.3 \times 10^8$ dyne/cm$^2$ and a loss coefficient of $\eta_E (= E''/E') = 0.3$, determined by a resonance and its width in a vibrational reed method. Taking a particle board as a counterpart, which has corresponding values of $E'_b = 10^{10}$ dyne/cm$^2$, $\eta_b = 0.1$, and $d_b = 0.3$cm, a composite compound made with Example 5 gains $\eta = 2.9$ and its noise reduction will be $\Delta L = 20$db at resonance, referred to the relation $\eta = 14\eta_E \cdot (E'/E_b)/(d/d_b)^2$ and $\Delta L = 20 \cdot \log(\eta/\eta_b)$ described by K. Iida in an article entitled "SEISHINZAIRYO TO SONO TEKIYOHO" 1984, Kikai Sekkei, Vol. 28, No 2, pp. 36–48 In addition to this an attenuation of 6 db/cm+TL$_O$ is expected at 0.5 KHz. The composite behavior of the noise reduction device is excellent.

It was noted that Examples 5, 6, and 11 were molded to various forms of thread, membranes, and sponge since emulsion polymers can be spun. This leads to a highly qualified flexible absorbent. Pelletization was attained by the well known spraying process or simply by the shredding technique. Granular form of the compositions of the examples can be mixed with cement, powdered wood or dispersed in water and also absorb sound energy proportional to their content in the medium. Acoustic activities of the mixed plaster and the mortar reach up to 10 db/cm and 0.7 db/cm, respectively. This has never been achieved so far. The suspension could be injected into the ground, performing an excellent insulator against subway noise. A stricter mechanical stability on a plate board was achieved by molding the plate with a compatible resin. All Examples can be mechanically powdered, foamed by using a vaporized gas, and molded into a solid plate through kneading and drying with compatible polymer. Application Example 1 is a case of a coagulation with polyvinylacetate solution and Application Example 2 is a case with epoxy resin. By this technique a door can be molded with high insulation, more than 50 db at a thickness 3cm can be provided.

It was noted that no absorption at 500 Hz was found in Comparison Examples 1 and 4 without the acoustic activity agents and in Comparison Example 2 and 3 without the hardeners.

It was stated that a large sound absorption due to stochastic resonance at audio frequency was found in a system primarily composed of polymers. They are melanin, lignin, urea oligomer, polyvinyl alcohol, polyacrylamid, some polymer colloids, and those mixture shown in Japanese patent publications set forth above. Their specific feature is an amorphous structure with a partially ordered structure composed of rod-like molecules, planer groups, or three dimensional micelies. All of them have polar groups so that thermally agitated vibration of backbone chain excites electrons. Namely, phonon-electron interaction along the ordering chain, called polaron, causes acoustic activity through impurity semiconduction as emphasized by Cerf and prepared by the present Inventor in detail. The experimental data and the theoretical concept strongly suggest that any polymer colloid should show the activity on account of its ordered structure referring to Flory's text book and Two-State Structure described by N. Ise, H. Matsuoka and K. Ito in an article entitled "Mutural action and Structural Formation in Polymeric Ion" 1993, KOBUNSHI Vol. 42 pp. 64–67. The two state structure actually holds in a whole hydration range. Decreasing hydration the ordered structure repeatedly increases and decreases along its phase diagram. Acoustic attenuation in the drying process firmly examined on melanin polymers is described by R. Kono, H. Yoshizaki, Y. Miyake and Y. Izumi, in an article entitled "Ultrasonic shear spectrum in hydrated diethylamine (DEA) melanins and its relation to stacking in a planer group" 1981, J. Chem. Phys. Vol. 75, pp. 4654–4660. It was aldo found that high attenuation increases with an increases of a stacking degree of indole planer group less than 20% hydration. In order to get efficient filtration from melanin solution, (and colloid solution) a strong acid like hydrochloric or sulfuric acid is generally added, but this must be avoided because it destroyed the activity. Even in a weak acid, careful action in mixing is necessary to keep activity. A proper selection of polymer coagulants, hardener and agent is another matter of key importance. The chemical structure of the present coagulation is similar to a conventional resin but the physical structure is quite different because the ordered structure holds in the dry state to give high attenuation. The cooperative effect of the coagulants noted in comparison by the measure give rise to a quenched ordering in the functional insulation resins. The origin of the absorption was the basis for claiming beyond the enablement on the polymer colloids.

While the invention has been described in conjunction with various particular embodiments, these embodiments are intended to exemplify the invention, and do not limit the scope thereof. Those skilled in the art will recognize that various modifications may be made without departing from the spirit and scope of the invention as described in the following claims.

What is claimed is:

1. A functional sound insulation resin dehydrated to a condensed aggregation which comprises: a polymer colloid or an admixture of a polymer colloid with a hydrated thermosetting resin, a hardener selected from the group consisting of tannin and lignin, and an acoustic activity agent selected from the group consisting of hydrazine monohydrate and diethylamine.

2. The functional sound insulation resin according to claim 1, wherein said polymer colloid consists of at least one member selected from the group consisting of acrylonitrile-butadiene rubber latex, styrene-butadiene rubber latex, natural rubber latex, urethane polymer emulsion, acrylate polymer emulsion, vinylacetate polymer emulsion, ethylene-vinylacetate polymer emulsion, vinylidene chloride polymer emulsion, and asphalt emulsion.

3. The functional sound insulation resin according to claim 1, wherein said hydrated thermosetting resin includes at least one member selected from the group consisting of an oligomer of urea, melamine, phenol, resorcinol, and copolymeric complexes thereof.

4. The functional sound insulation resin according to claim 1, wherein said condensed aggregation contains from 40 to 91 weight percent of dry polymer colloid, from 0 to 47 weight percent of dry thermosetting resin, from 1 to 11 weight percent of a dry hardener, and a pure acoustic activity agent ranging from 1 to 14 weight percent.

5. A functional sound insulation resin comprising a polymer colloid, a hardener and an acoustic activity agent, wherein said a resin has an attenuation constant at least about 5 db/cm in a frequency range from 27 Hz to 1 KHz therefor.

6. A functional sound insulation resin having an attenuation constant at least about 5 db/cm in a frequency range from 27 Hz to 1 KHz comprising:
a polymer colloid with a hydrated thermosetting resin; a hardener including at least one selected from tannin and lignin; and an acoustic activity agent including at least one selected from hydrazine monohydrate and diethylamine.

7. The functional sound insulation resin according to claim 6, wherein said polymer colloid is an admixture of polymer colloids.

* * * * *